United States Patent
Lemoine

(10) Patent No.: US 9,838,209 B2
(45) Date of Patent: Dec. 5, 2017

(54) METHOD FOR SUBSCRIBING TO STREAMS FROM MULTICAST CLIENTS

(71) Applicant: Orange, Paris (FR)

(72) Inventor: Benoit Lemoine, Ploubezre (FR)

(73) Assignee: ORANGE, Paris (FR)

( * ) Notice: Subject to any disclaimer, the term of this patent is extended or adjusted under 35 U.S.C. 154(b) by 62 days.

(21) Appl. No.: 15/026,892

(22) PCT Filed: Sep. 11, 2014

(86) PCT No.: PCT/FR2014/052260
§ 371 (c)(1),
(2) Date: Apr. 1, 2016

(87) PCT Pub. No.: WO2015/049431
PCT Pub. Date: Apr. 9, 2015

(65) Prior Publication Data
US 2016/0241410 A1    Aug. 18, 2016

(30) Foreign Application Priority Data
Oct. 1, 2013 (FR) .................. 13 59507

(51) Int. Cl.
*H04L 12/18* (2006.01)
*H04L 29/12* (2006.01)
(Continued)

(52) U.S. Cl.
CPC ........ *H04L 12/185* (2013.01); *H04L 12/1877* (2013.01); *H04L 61/2069* (2013.01); *H04L 65/608* (2013.01); *H04L 65/80* (2013.01)

(58) Field of Classification Search
CPC ............... H04L 12/185; H04L 12/1877; H04L 61/2069; H04L 65/608; H04L 65/80
See application file for complete search history.

(56) References Cited

U.S. PATENT DOCUMENTS

2003/0156540 A1 *  8/2003  Trossen .............. H04L 12/1836
                                                      370/232
2004/0030787 A1 *  2/2004  Jandel ................. H04L 12/1813
                                                      709/229
(Continued)

FOREIGN PATENT DOCUMENTS

WO    2011067495 A2    6/2011

OTHER PUBLICATIONS

International Search Report dated Dec. 9, 2014 for corresponding International Application No. PCT/FR2014/052260, filed Sep. 11, 2014.
(Continued)

*Primary Examiner* — Jenee Holland
(74) *Attorney, Agent, or Firm* — David D. Brush; Westman, Champlin & Koehler, P.A.

(57) ABSTRACT

A method for requesting subscription to a data stream distributed in a multicast group. The group includes sources including a server, a first client and a second client, the sources being interconnected via an electronic communications network. The multicast group is identified by an address. A stream transmitted to the multicast group address by a first source is received by a second source if the second source is already subscribed to the first source. The first client is subscribed to the server. The method includes the first client performing acts of: receiving from the server at least one management message including at least one quality parameter relating to the stream transmitted to the address of the multicast group by the second client; making a decision to subscribe to the second client, according to a criterion dependent on the at least one quality parameter received; and, in the case of a positive decision, transmitting a subscription request message to the second client.

11 Claims, 3 Drawing Sheets

Figure 1:
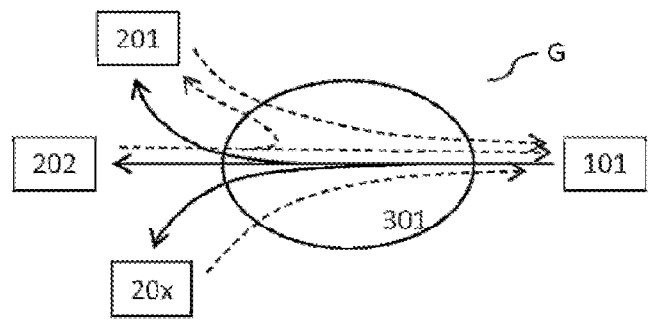

(51) Int. Cl.
*H04L 29/08* (2006.01)
*H04L 29/06* (2006.01)

(56) References Cited

U.S. PATENT DOCUMENTS

| | | | |
|---|---|---|---|
| 2005/0163146 A1* | 7/2005 | Ota | H04L 12/4633 370/432 |
| 2005/0204242 A1* | 9/2005 | Chou | H04L 1/0017 714/741 |
| 2006/0184683 A1* | 8/2006 | Bosscha | H04L 12/18 709/230 |
| 2007/0263625 A1 | 11/2007 | Engstrand | |
| 2007/0280232 A1* | 12/2007 | Dec | H04L 12/18 370/390 |
| 2008/0028211 A1* | 1/2008 | Tanizawa | H04L 63/065 713/163 |
| 2008/0186962 A1* | 8/2008 | Sinha | H04L 12/185 370/389 |
| 2008/0247373 A1* | 10/2008 | Synnergren | H04L 12/189 370/340 |
| 2009/0089848 A1* | 4/2009 | Satou | H04N 7/17318 725/109 |
| 2010/0281093 A1* | 11/2010 | Poder | H04L 12/185 709/201 |
| 2011/0213887 A1* | 9/2011 | Hernanz | H04L 65/4069 709/227 |
| 2012/0287832 A1 | 11/2012 | Lemoine et al. | |
| 2012/0324519 A1* | 12/2012 | Laughlin | H04N 21/23439 725/95 |
| 2014/0098813 A1* | 4/2014 | Mishra | H04L 12/185 370/390 |

OTHER PUBLICATIONS

English translation of the International Written Opinion dated Feb. 2, 2016 for corresponding International Application No. PCT/FR2014/052260, filed Sep. 11, 2014.
Bhatt Acharyya et al., "An Overview of Source-Specific Multicast (SSM); rfc3569.txt", Jul. 1, 2003 Jul. 1, 2003 (Jul. 1, 2003) XP015009351.
Cain et al., "Internet ghroup Management Protocol, Version 3; rfc3376.txt" Oct. 2002, Oct. 2002.
Friedman et al., "RTP Control Protocol Extended Reports (RTCP XR); rfc3611.txt" Nov. 2003, Nov. 2011.
Schulzrinne et al., "RTP: A Transport Protocol for Real-Time Applications; rfc3550.txt", Jul. 1, 2003, Jul. 1, 2003 (Jul. 1, 2003) XP015009332.
Vida et al., "Multicast Listner Discovery Version 2 (MLDv2) for IPv6; rfc3810.txt", Jun. 2004, Jun. 2004.

* cited by examiner

METHOD FOR SUBSCRIBING TO STREAMS FROM MULTICAST CLIENTS

CROSS-REFERENCE TO RELATED APPLICATIONS

This Application is a Section 371 National Stage Application of International Application No. PCT/FR2014/052260, filed Sep. 11, 2014, which is incorporated by reference in its entirety and published as WO 2015/049431 A1 on Apr. 9, 2015, not in English.

1. Field of the Invention

The application for invention lies in the field of multicast data stream distribution groups.

More precisely, the application for invention relates to bidirectional multicast distribution groups as well as subscription to streams originating from multicast clients.

2. Prior Art

The services implementing multicast transport in IP (Internet Protocol) networks were initially limited to the distributing of packets originating from a multicast server destined for multicast clients. Thus in the case of the distributing of television over the Internet, the network front-end server is either controlled by the operator, or controlled by a content provider with which the operator has agreements, thereby allowing him to control the quality of service up to the client.

The multicast mode of transport is now no longer used only in the downgoing direction from a server to multicast clients, but by allowing each multicast client to send multicast IP packets to the multicast group via the transport network.

If one client sends a significant bitrate of multicast IP traffic to the IP address of the multicast group to which other clients are subscribers, the latter's interface for access to the IP network risks being saturated by the multicast IP traffic of the former.

In order to limit the number of multicast streams received by a multicast client, the latter can ask the network to receive multicast streams by specifying in addition to the IP address of the multicast group the source IP address or addresses to be authorized or excluded for example with the aid of the IGMPv3 protocol (Internet Group Management Protocol) defined in norm IETF RFC 3376 (Internet Engineering Task Force, Request For Comments) or of the MLDv2 protocol (Multicast Listener Discovery) defined in norm IETF RFC 3810.

Hereinafter in the document, when a multicast client subscribes to a multicast stream sent by another client or by a server, this signifies that the IP address of this other client or of the server is specified in a multicast stream reception request.

Patent application WO 2011/067495 describes a method for controlling admission of the IGMPv3 or MLDv2 requests making it possible to limit the number of multicast streams to be sent back down to a client by comparing the guaranteed downgoing bitrates with the authorized upgoing bitrates, but this method assumes that these bitrates are known to the admission control entity.

These bitrates are not always known. Such is the case for example when the multicast streams are sent by multicast clients accessing the network through a Wi-Fi access point. It is then impossible to know in advance the bitrate of the various upgoing IP multicast streams since not all Wi-Fi terminals implement IEEE (Institute of Electrical and Electronics Engineers) norm 802.11e.

One of the aims of the invention is to remedy these drawbacks of the prior art.

3. Disclosure of the Invention

The invention improves the situation with the aid of a method for requesting subscription to a data stream distributed in a multicast distribution group, said group comprising sources, including a server, a first client and a second client, said sources being connected together through an electronic communications network, the multicast distribution group being identified by an address, a stream sent to the address of the multicast group by a first source being received by a second source if the second source is previously a subscriber to the first source, the first client being a subscriber to the server, the method comprising the following steps implemented by the first client:

reception, originating from the server, of at least one management message comprising at least one quality parameter relating to the stream sent to the address of the multicast group by the second client, decision of subscription to the second client, as a function of a criterion depending on the at least one quality parameter received, in case of positive decision, sending of a message requesting subscription to the second client.

By virtue of the invention, a first client of a bidirectional multicast group obtains from the server quality parameters of a stream sent by a second client, before subscribing thereto. Thus, if one or more quality parameters obtained from the server indicate that a criterion conditioning the subscription of the first to the second client is not fulfilled, such as for example a signal demanding too much bitrate or too much memory in a queue, the first client may decide not to subscribe thereto. According to the earlier technique, no information was available to a client in relation to the quality of a multicast stream sent by another client, before subscribing thereto in order to receive this stream.

According to one aspect of the invention, the decision step takes into account a criterion comprising the value of a mean bitrate necessary in order to receive the stream sent to the address of the multicast group by the second client, and is preceded by a step of calculation of this value, on the basis of the at least one quality parameter.

The quality parameters included for example in a management message of RTCP SR (Real-time Transfer Control Protocol, Sender Report) type sent by a multicast server according to RFC 3550 are: the number of packets received, the number of useful bytes of the RTP packets received (Real-time Transfer Protocol), and the number of RTP packets lost since the start of an RTP session.

Advantageously, with the aid of these quality parameters it is therefore possible for the first client to calculate the mean bitrate of the stream sent by the second client, which is identical to the mean bitrate necessary in order to receive this stream.

According to one aspect of the invention, the decision step takes into account a criterion comprising the value of a queue size necessary in order to receive the stream sent to the address of the multicast group by the second client, and is preceded by a step of calculating this value, on the basis of the at least one quality parameter.

The quality parameters included for example in a management message of RTCP XR (eXtended Report) type sent by a multicast server according to RFC 3611 are: the rate of lost RTP packets, the rate of RTP packets not taken into account owing to late or early arrival, the rate of RTP packets lost or not taken into account during a burst, the rate of RTP packets lost or not taken into account between two bursts.

Advantageously, with the aid of these quality parameters it is therefore possible for the first client to calculate a value of queue size associated with the stream sent by the second client.

According to one aspect of the invention, the subscription request message comprises the calculated value.

The calculated bitrate represents an additional bitrate with respect to what the first client already receives in terms of bitrate before its subscription to the second client. Likewise the calculated queue size represents an additional size with respect to what the first client already receives in terms of queue before its subscription to the second client.

Advantageously, by virtue of the inclusion, in its subscription request, of the mean bitrate calculated and/or of the queue size calculated in order to receive the stream, if the first client has taken the decision to subscribe without knowing whether this bitrate or this additional queue size is at its disposal, it allows another entity of the network, receiving the request, to verify that this additional bitrate is indeed available in the downgoing direction toward the first client.

The various aspects of the method for requesting subscription to a data stream which have just been described can be implemented independently of one another or in combination with one another.

The invention further relates to a device for requesting subscription to a data stream able to implement the method for requesting subscription to a data stream which has just been described, in all its embodiments.

The invention also relates to a method for managing data streams distributed in a multicast distribution group, said group comprising sources, including a server, a first client and at least one second client, said sources being connected together through an electronic communications network, the multicast distribution group being identified by an address, a stream sent to the address of the multicast group by a first source being received by a second source if the second source is previously a subscriber to the first source, the first client being a subscriber to the server, the server being a subscriber to said at least one second client and being able to receive a stream sent by the second client to the address of the multicast group, and to extract therefrom at least one parameter relating to the quality of said stream, the method comprising the following steps implemented by the server:
  selection of at least one client from among the at least one second client, as a function of the at least one parameter extracted,
  sending to the address of the multicast group of at least one management message comprising the at least one extracted parameter corresponding to the at least one selected client.

The server, which is a subscriber to all the streams of the multicast group, therefore receives all the streams sent by all the terminals of the multicast group, including, in particular, messages sent by the first and second terminals to the address of the multicast group, for example the messages of RTP type which comprise payload data as well as the identifier of their sender.

This therefore allows the server to measure certain quality parameters of the payload data received from the terminals and to associate them with them.

The server therefore becomes capable of sending, in a stream to the address of the multicast group, that is to say to all the terminals of the group, management messages comprising a certain number of parameters, which will be for each of these terminals an aid to the decision to subscribe to the stream of one or more other terminals of the group.

These management messages are for example messages of RTCP SR or XR type, which comprise an identifier of a sending source as well as certain quality parameters such as number of bytes or of packets received in a given time interval, number of lost packets, jitter, etc., these parameters being representative of the quality of the link between the source, that is to say the client, and a node of the network in the upgoing direction.

Certain terminals have a poor upgoing stream quality, which make them poor candidates for the other terminals wishing to subscribe to streams of the multicast group other than those of the server.

By virtue of the selection step, the server can eliminate from its management messages the items of information relating to the terminals whose upgoing stream is of poor quality, and this will preclude the other terminals from considering them to be good subscription candidates.

Advantageously according to the invention, the number of RTCP SR/XR messages sent by the server is thus reduced with respect to the earlier technique where it automatically dispatches such a message as soon as it receives an RTP stream.

Moreover, the management messages relating to streams of poor quality can only be utilized, if at all, with difficulty by the terminals receiving them. By virtue of the sending step, the terminals receive only utilizable management messages, in contradistinction to the earlier technique.

The invention further relates to a device for managing data streams which is able to implement the method for managing data streams which has just been described, in all its embodiments.

The invention also relates to a client item of equipment of a multicast distribution group connected to an electronic communications network and comprising a device for requesting subscription to a data stream such as described above. This client item of equipment may be for example a user terminal such as a smartphone, a digital tablet, a computer or a sensor.

The invention also relates to a server item of equipment of a multicast distribution group connected to an electronic communications network and comprising a device for managing data streams such as described above. This server item of equipment may be for example a television server, a games server, a videoconferencing server or else a sensor network server.

The invention further relates to a multicast distribution group comprising a server item of equipment and at least two client items of equipment such as described above, the items of equipment being connected together through an electronic communications network.

The invention also relates to a computer program comprising instructions for the implementation of the steps of the method for requesting subscription to a data stream which has just been described, when this method is executed by a processor.

The invention relates moreover to a recording medium, readable by a client item of equipment, on which the program which has just been described is recorded, being able to use any programming language, and be in the form of source code, object code, or of code intermediate between source code and object code, such as in a partially compiled form, or in any other desirable form.

The invention also relates to a computer program comprising instructions for the implementation of the steps of the method for managing data streams which has just been described, when this method is executed by a processor.

The invention relates finally to a recording medium, readable by a server item of equipment, on which the program which has just been described is recorded, being able to use any programming language, and be in the form of source code, object code, or of code intermediate between source code and object code, such as in a partially compiled form, or in any other desirable form.

4. Presentation of the Figures

Figure 2:
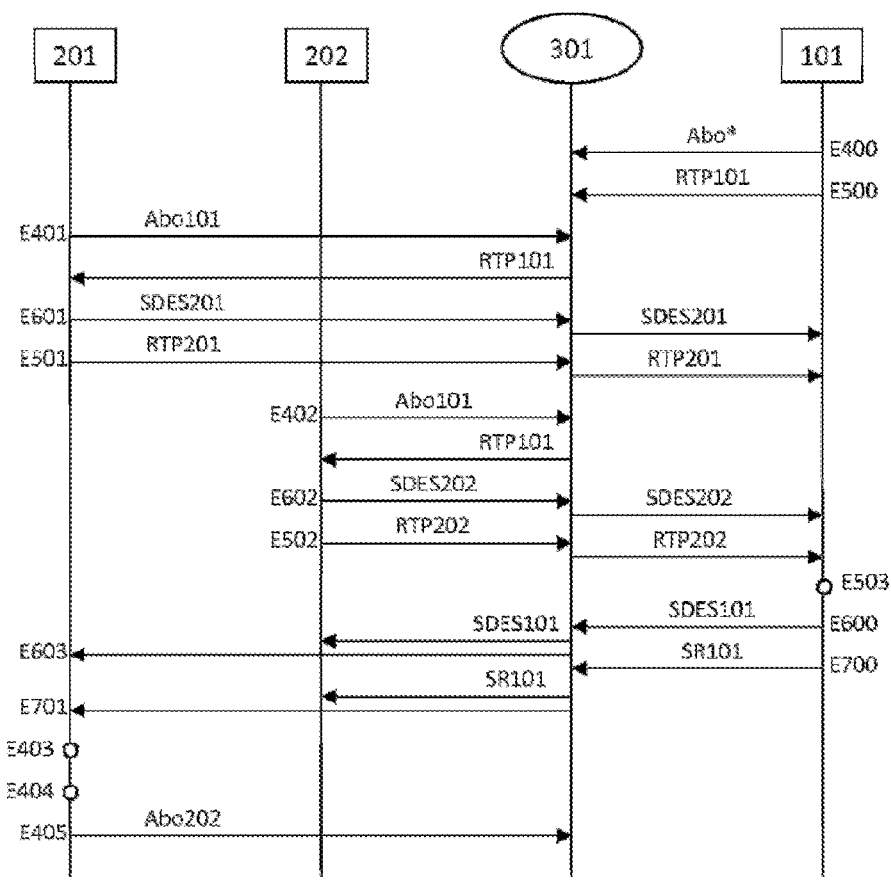
Figure 3:
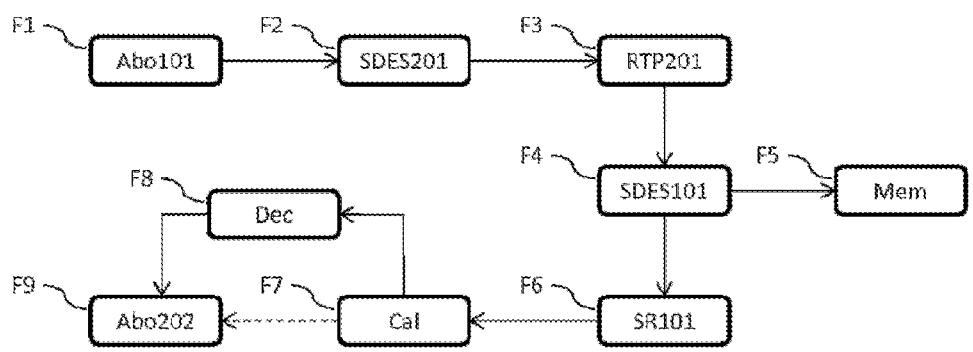
Figure 4:
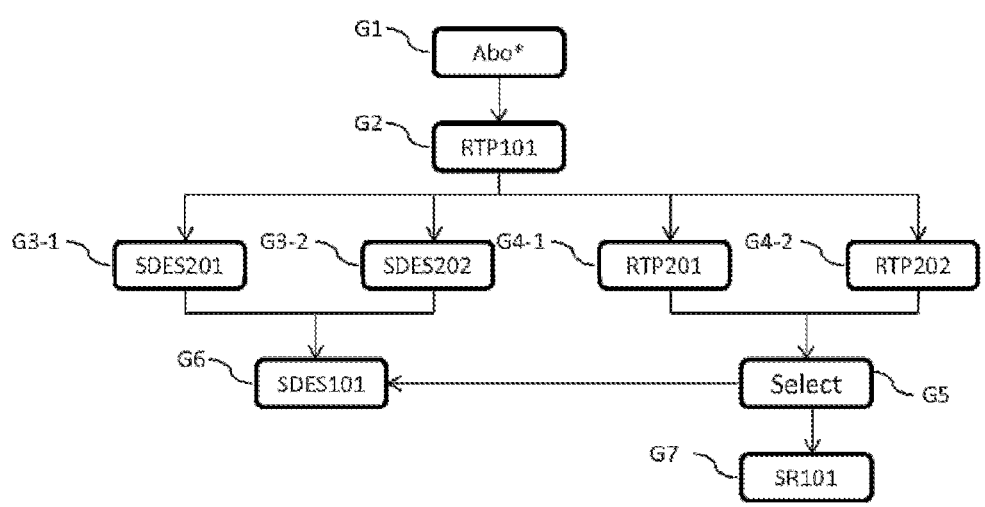
Figure 5:
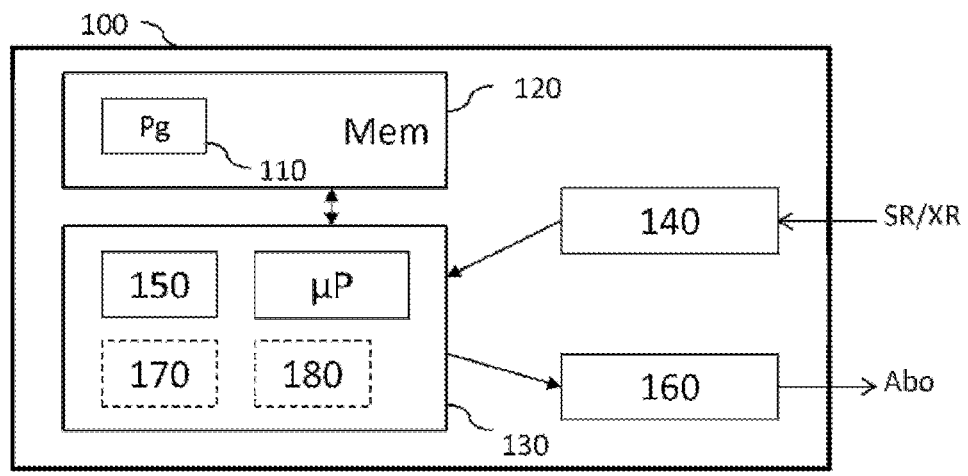
Figure 6:
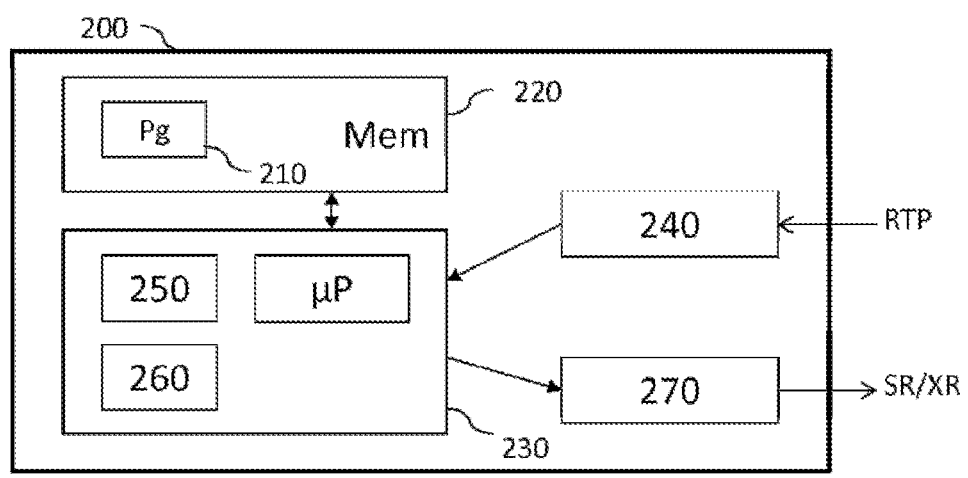

Other advantages and characteristics of the invention will be more clearly apparent on reading the following description of a particular embodiment of the invention, given by way of simple illustrative and nonlimiting example, and of the appended drawings, among which:

FIG. 1 presents in a schematic manner a multicast distribution group in a network comprising several sources, including a server, according to an aspect of the invention, FIG. 2 presents an exemplary stringing together and implementation of the steps of the method for requesting subscription to a data stream and of the method for managing data streams, according to an aspect of the invention, FIG. 3 presents an exemplary implementation, by a client, of the steps of the method for requesting subscription to a data stream, according to an aspect of the invention, FIG. 4 presents an exemplary implementation, by a server, of the steps of the method for managing data streams, according to an aspect of the invention, FIG. 5 presents an exemplary structure of a device for requesting subscription to a data stream, according to an aspect of the invention, FIG. 6 presents an exemplary structure of a device for managing data streams, according to an aspect of the invention.

5. Detailed Description of at Least One Embodiment of the Invention

In the subsequent description, examples are presented of several embodiments of the invention based on the multicast distribution protocols of the IETF, but the invention also applies to other protocols, such as for example ATM (Asynchronous Transfer Mode) or Ethernet, or else a transport protocol suitable for sensors, such as ZigBee, Bluetooth or Wi-Fi.

FIG. 1 presents in a schematic manner a multicast distribution group in a network comprising several sources, including a server, according to an aspect of the invention.

In such a multicast distribution group G with address aG, each source is connected to an electronic communications network 301, generally a network of IP type, and can send packets to aG of the packets to the network 301.

The sources are either clients, such as the clients 201 to 20x, or a server, such as the server 101.

At the minimum, each client 201 to 20x subscribes to the multicast stream with address aG, sent by the server 101. All the clients therefore receive everything that is sent by the server to aG, as indicated by the solid lines. A client does not receive what is sent by another client as long as it is not expressly subscribed to the multicast stream with address aG sent by this other client.

On its side, the server subscribes to the multicast streams with address aG sent by each of the clients 201 to 20x. The server therefore receives everything that is sent by the clients to aG, as indicated by the dashed lines, thereby allowing it in particular to receive their respective RTP traffic.

In a multicast group, a client sends real-time data, also called RTP traffic, and control messages, also called RTCP messages. RTP packets are for example distributed every ten milliseconds, but the RTCP control messages are distributed with a lower frequency, for example every second.

The RTP traffic received from a client by the server allows it to obtain items of information relating to the stream sent by this client, and to send messages of RTCP SR or XR type, comprising parameters relating to the quality of the stream of this client received by the server.

According to the invention, the server selects the clients for which it sends RTCP SR or XR messages. The earlier technique, on the contrary, constrained by RFC 3550, does not differentiate between the client and the server and forces the server to send such messages either for all the clients of the multicast group, or for none. Advantageously, the server according to the invention will not select clients for which, for example, the quality parameters exhibit insufficient values.

According to the invention, a client wishing to subscribe to another client can calculate, with the aid of the RTCP SR or XR messages received from the server, the mean bitrate necessary in order to receive its stream, and thus determine, as a function of the downgoing bitrate which is available to it, whether it is possible for it to subscribe.

But in order to subscribe, this client must know the IP address of the client from which it wishes to receive the stream and whose necessary mean bitrate it has calculated. The RTCP SR or XR messages, like the RTP messages, do not comprise any source IP address of the streams to which they refer but only SSRC (Synchronization SouRCe) identifiers, so as to ensure independence between IP network and multicast network.

An SDES (Source DEScription) RTCP message received from a client by the server allows it, however, to associate the IP address to the SSRC identifier of the client. Indeed, the messages of SDES RTCP type comprise, in addition to the SSRC identifier of the sending source, another identifier containing in ASCII form the IPv4 or IPv6 address of this source.

The server can re-send the SDES RTCP messages received from the various clients to the address aG, or aggregate them so as to send an aggregated SDES RTCP message to the address aG. When a client receives the aggregated SDES RTCP message, this allows it to associate the IP addresses of the other clients to their SSRC identifier. This is necessary for at least two reasons:
1. the first is that a request for subscription to a client, using an IGMPv3 or MLDv2 request, must specify the IP address of this client, whereas the RTCP SR or XR messages according to RFC 3550 specify only the SSRC identifier of a source;
2. the second is that an SSRC identifier must be unique in a multicast group, and that a client which subscribes only to the multicast stream sent by the server does not know the SSRC identifiers already used and may very well be allotted an identifier already taken, thereby giving rise to a degradation of the quality of the multicast distribution to the clients in conflict.

FIG. 2 presents an exemplary stringing together and implementation of the steps of the method for requesting subscription to a data stream and of the method for managing data streams, according to an aspect of the invention.

For ease of illustration, the number of clients is reduced to two in the figure, with a first client 201 wishing to subscribe to a second source other than the server, and a single second client 202. The following explanations also apply to the case where several second clients 202, 203, 204, etc. form part of the multicast group with the first client 201 and the server 101.

During a step E400, the server 101 subscribes to the set of streams to the multicast address aG, by sending an IGMPv3 or MLDv2 request to the network 301, specifying the address aG as multicast group address and not excluding any source address.

During a step E500 the server 101 begins to send RTP traffic to the multicast address aG, using its source address S. Neither of the clients 201 or 202 receives this traffic, or any other traffic sent by the address S, as long as they are not individually subscribers to the stream, sent by the address S, to the multicast address aG.

During a step E401, the client 201 subscribes to the stream, sent by the address S, to the multicast address aG, by sending an IGMPv3 or MLDv2 request to the network 301, specifying the address aG as multicast group address and the address S as source address. The client 201 begins to receive the RTP traffic sent for the multicast group by the address S, that is to say by the server.

During a step E601, the client 201 sends an SDES RTCP message comprising its own address IP1 and its own identifier SSRC1.

During a step E501, the client 201 sends RTP traffic to the multicast address aG, using its source address IP1.

During a step E402, the client 202 subscribes to the stream, sent by the address S, to the multicast address aG, by sending an IGMPv3 or MLDv2 request to the network 301, specifying the address aG as multicast group address and the address S as source address. The client 202 begins to receive the RTP traffic sent for the multicast group by the address S, that is to say by the server.

During a step E602, the client 202 sends an SDES RTCP message comprising its own address IP2 and its own identifier SSRC2.

During a step E502, the client 202 sends RTP traffic to the multicast address aG, using its source address IP2.

During a step E503, the server 101, having previously received the RTP traffic destined for the multicast address aG, selects at least one client from among the sources 201 and 202, as a function of parameters obtained in their respective RTP traffic. During step 503, the server 101 can determine whether the RTP traffic received originating from a source exhibits packet losses, by verifying the continuity of the sequence numbers contained in the header of the RTP packets. The server 101 may for example decide to select the source client solely in case of absence of packet loss. Other selection criteria can be adopted, such as excessive inter-arrival jitter, inter-arrival jitter being defined in RFC 3550.

To facilitate the explanation it is assumed hereinafter that the client 202 is among the clients selected during this step E503.

During a step E600, the server 101 generates and sends an aggregated SDES RTCP message, composed of extracts of the SDES RTCP messages received subsequent to steps E601 and E602, originating from the clients selected during step E503. The clients receiving the aggregated SDES RTCP message can thus take cognizance of the IP address associated with the SSRCs of the other clients and detect a possible collision of SSRCs.

During a step E603, the client 201 receives the aggregated SDES RTCP message and stores the pairs {IP address, SSRC identifier} that it contains. In particular, it henceforth knows that the identifier SSRC2 corresponds to the address IP2.

During a step E700, the server 101 sends an RTCP SR message comprising quality parameters relating to the RTP traffic sent by the clients selected during step E503, these clients being identified solely by their SSRC in the message. The sequence numbers as well as the temporal information contained in the header of the RTP packets are used for this purpose, such as defined in RFC 3550.

During a step E701, the client 201 receives the RTCP SR message comprising quality parameters relating to the RTP traffic sent by the client 202. The RTCP SR message indicates the identifier SSRC2, but not the address IP2. Norm IETF RFC 3550 has defined the following items of information for the RTCP SR message:

the SSRC identifier of the RTP source that sent the RTP stream received to which the following items of information correspond:

the number OC of useful bytes of the RTP packets received since the start of the RTP session originating from the RTP source, the number PC of RTP packets received since the start of the RTP session originating from the RTP source, the number LPC of RTP packets lost since the start of the RTP session originating from the RTP source, the inter-arrival jitter calculated according to an algorithm defined by RFC 3550.

Each RTCP SR message contains in addition a temporal item of information NTP (Network Time Protocol) relating to its instant of sending.

During a step E403, the client 201 calculates a value of mean bitrate associated with the stream sent by the client 202, with the aid of the items of information included in the message received during step E701.

This useful mean bitrate value can be calculated for each time period lying between the instant NTP(n) of sending of an RTCP SR message received by a client (that is to say in our example the client 201) and containing items of information OC(n,i) and LPC(n,i) relating to a source SSRC(i) (that is to say in our example the client 202) and the instant of sending NTP(n+j) of any following RTCP SR message received by this client (201) and containing items of information OC (n+j,i) and LPC(n+j,i) relating to the same source SSRC(i).

If the value LPC(n+j,i) is equal to the value LPC(n,i) then the mean number MPR of packets sent per unit time by the source SSRC(i) can be calculated as being equal to MPR= [PC(n+j,i)−PC(n,i)]/[NTP(n+j)−NTP(n)].

It will be noted that if the value LPC(n+j,i) is not equal to the value LPC(n,i) this signifies that the server has not received the whole set of RTP packets originating from the source SSRC(i) during this time period, so that there is a strong risk of the client (201) not receiving the whole set of RTP packets originating from this source if it asks the network to receive the multicast stream originating from this source. Indeed, the IP network core being generally well dimensioned, the most probable cause of packet loss will be, for example, either the Wi-Fi segment between the source SSRC(i) and the Wi-Fi access point to which it is attached, or the attachment link to the network of this Wi-Fi access point.

In order to evaluate the corresponding mean bitrate, it is possible to determine the mean size MPS of the payload of IP packets which are used by the source SSRC(i) for the transport of its RTP stream as being equal to MPS=[OC(n,i)/PC(n,i)].

In the case where this mean size of the payload is an integer and does not vary [OC(n+j,i)/PC(n+j,i)]=[OC(n,i)/PC(n,i)], the client will be able to evaluate the mean bitrate corresponding to the RTP stream sent by the source SSRC(i) as being equal to the mean number of packets sent per unit time by this source, multiplied by the mean size of the payload increased by the size HS of the IPv4 header (20 bytes) or IPv6 header (40 bytes) and of the UDP header (8 bytes) of the IP packet transporting it.

It is for example possible to calculate the mean bitrate according to the formula:

$$MPR \times MPS = \{[OC(n+j,i) - OC(n,i)] + HS \times [PC(n+j,i) - PC(n,i)]\}/[NTP(n+j) - NTP(n)]$$

During a step E404, the client 201 decides or otherwise to subscribe to the stream sent by the client 202 to the multicast address aG. If the client 201 is aware of a bandwidth negotiated with the network, it may decide to subscribe only in the case where the downgoing bandwidth is sufficient for the mean bitrate calculated during step E403.

During a step E405, the client 201 subscribes to the stream destined for the multicast address aG sent by the address IP2 of the client 202, by sending an IGMPv3 or MLDv2 request to the network 301, specifying the address aG as multicast group address and the address IP2 as source address. The client 201 obtains the address IP2 by searching, among the pairs stored during step E603, for the IP address corresponding to the identifier SSRC2 of the client 202.

The client 201 can then begin to receive the RTP traffic sent for the multicast group by the client 202.

If the client 201 is not aware of a bandwidth negotiated with the network, it may include in the IGMPv3 or MLDv2 request the mean bitrate calculated during step E403, so that the network can take the decision, by carrying out what is called an admission control.

In an alternative embodiment, the server sends RTCP XR messages, instead of or in addition to the RTCP SR messages.

In this mode, during step E700 hereinabove, alternatively or in a complementary manner, the server 101 sends an RTCP XR message comprising quality parameters, different from those included in a message of RTCP SR type, relating to the RTP traffic sent by the clients selected during step E503, these clients being identified solely by their SSRC in the message.

In this mode, during step E701 hereinabove, the client 201 receives the RTCP XR message comprising quality parameters relating to the RTP stream sent by the client 202. The RTCP XR message indicates the identifier SSRC2 but not the address IP2. Norm IETF RFC 3611 has defined the following items of information for the RTCP XR message:
 the SSRC (Synchronization Source) identifier of the RTP source that sent the RTP stream received to which the following items of information correspond:
 the rate of lost packets (loss rate) since the start of the reception of an RTP stream originating from the RTP source,
 the rate of packets of an RTP stream originating from the RTP source not taken into account (discard rate) owing to late or early arrival, inducing either drainage, or overflow of the jitter suppression buffer,
 the rate of packets lost or not taken into account during a burst (burst density) for an RTP stream originating from the RTP source,
 the rate of packets lost or not taken into account between two bursts (gap density) for an RTP stream originating from the RTP source,
 the mean duration of burst (burst duration) for an RTP stream originating from the RTP source,
 the mean duration between two bursts (gap duration) for an RTP stream originating from the RTP source.

Still in this mode, during step E403 hereinabove, the client 201 calculates a value of queue size necessary in order to receive the stream sent by the client 202, with the aid of the items of information included in the RTCP XR message received during step E701.

The items of information included in the RTCP XR message allow the client 201 to ascertain the mean duration of the bursts, the mean duration between two bursts, as well as the rate of packets lost or not taken into account owing to drainage or overflow of a jitter suppression buffer which would receive the RTP stream sent by a given RTP source. Assuming the size of the jitter suppression buffer is known, a client can therefore evaluate its capacity to receive the RTP stream sent by a given RTP source.

When the size of the jitter suppression buffer is greater than the mean duration of the bursts and the mean duration between two bursts, and when the rate of packets lost or not taken into account owing to drainage or overflow of a jitter suppression buffer is low, for example 1%, the RTP client may for example decide to subscribe to the RTP stream sent by the RTP source in question.

It will be noted that the IETF can still define new messages complementary to the RTCP SR or XR messages and containing other items of information which could be useful to clients in order to decide to receive a stream sent by another client. The present mechanism will then be able to be applied in the same manner.

FIG. 3 presents an exemplary implementation, by a client, of the steps of the method for requesting subscription to a data stream, according to an aspect of the invention.

During a step F1, the client 201 sends to the network 301 a request for subscription to the multicast group with address aG while specifying as source the IP address of the server 101.

During a step F2, the client 201 sends an SDES RTCP message comprising its address IP1 and the identifier SSRC1 that it has been allotted.

During a step F3, the client 201 sends to the address aG real-time data in the form of RTP packets.

During a step F4, the client 201 receives an aggregated SDES RTCP message originating from the server 101, comprising pairs {IP address; SSRC identifier} corresponding to the various sources of the multicast group with address aG.

During a step F5, the client 201 stores the pairs received in a table T.

During a step F6, the client 201 receives an RTCP SR (and/or XR) message originating from the server 101, comprising quality parameters relating to the RTP traffic of the client sources of the multicast group with address aG.

During a step F7, the client 201 calculates a value of mean bitrate and/or of queue size necessary in order to receive the stream sent by the client 202.

During a step F8, the client 201 decides or otherwise to subscribe to the stream of the client 202, as a function of the bitrate available in its connection with the network, and/or of the size of its queue.

During a step F9, in case of positive decision subsequent to step F8, the client 201 consults its table T so as to obtain the IP address corresponding to the client 202 whose identifier SSRC2 it knows, and sends a request for subscription to the multicast group with address aG while specifying as source the address IP2 which is that of the client 202.

Alternatively, the decision step F8 can be omitted, and during step F9, the client 201 can include in its subscription request the value or values calculated during step F7, and let an entity of the network decide whether the subscription request may or must be satisfied.

FIG. 4 presents an exemplary implementation, by a server, of the steps of the method for managing data streams, according to an aspect of the invention.

During a step G1, the server 101 subscribes to the multicast group with address aG by sending to the network 301 a subscription request specifying the address aG of the multicast group, without excluding any source.

During a step G2, the server 101 sends to the address aG real-time data in the form of RTP packets.

During steps G3-1, G3-2, G3-$x$ (not illustrated since it is similar to G3-1 and G3-2), the server 101 receives originating respectively from the clients 201, 202, 20$x$ an SDES RTCP message comprising the IP address of the sender client and the SSRC identifier that it has been allotted.

During steps G4-1, G4-2, G4-$x$ (not illustrated since it is similar to G4-1 and G4-2), the server 101 receives originating respectively from the clients 201, 202, 20$x$ a stream of the real-time data in the form of RTP packets.

During a step G5, the server 101 selects from among the clients 201, 202 and 20$x$ those for which parameters relating to the quality of the RTP streams received during steps G4-1, G4-2, G4-$x$ exhibit satisfactory values, such as a zero number of lost packets and/or an inter-arrival jitter less than a certain threshold.

During a step G6, the server 101 generates and sends an aggregated SDES RTCP message comprising pairs {IP address; SSRC identifier} relating to the clients selected during step G5.

During a step G7, the server 101 sends an RTCP SR (and/or XR) message comprising quality parameters relating to the RTP traffic of the client sources selected during step G5, these clients being identified solely by their SSRC in the message.

In conjunction with FIG. 5, an exemplary structure is now presented of a device for requesting subscription to a data stream, according to an aspect of the invention.

The device 100 for requesting subscription to a data stream implements the method for requesting subscription to a data stream, various embodiments of which have just been described.

Such a device 100 can be implemented in a user terminal, such as a smartphone, a digital tablet, a computer or a sensor.

For example, the device 100 comprises a processing unit 130, equipped for example with a microprocessor μP, and driven by a computer program 110, stored in a memory 120 and implementing the method for requesting subscription to a data stream according to the invention. On initialization, the code instructions of the computer program 110 are for example loaded into a RAM memory, before being executed by the processor of the processing unit 130.

Such a device 100 comprises:
a reception module 140, able to receive from a server of a multicast group at least one management message comprising at least one quality parameter relating to a stream sent to the address of the multicast group by a client terminal of the multicast group,
a decision module 150, able to decide a subscription to the stream of the client terminal, as a function of a criterion depending on the at least one quality parameter received,
a sending module 160, able to send a message requesting subscription to the stream of the client terminal in case of positive decision.

Advantageously, the processing unit 130 can comprise:
a calculation module 170, able to calculate the value of a mean bitrate necessary in order to receive the stream sent to the address of the multicast group by the client terminal, on the basis of the at least one quality parameter,
a calculation module 180, able to calculate the value of a queue size necessary in order to receive the stream sent to the address of the multicast group by the client terminal, on the basis of the at least one quality parameter.

In conjunction with FIG. 6, an exemplary structure is now presented of a device for managing data streams, according to an aspect of the invention.

The device 200 for managing data streams implements the method for managing data streams, various embodiments of which have just been described.

Such a device 200 can be implemented in a multicast server, such as a TV server, a games server, a videoconferencing server or else a sensor network server.

For example, the device 200 comprises a processing unit 230, equipped for example with a microprocessor μP, and driven by a computer program 210, stored in a memory 220 and implementing the method for managing data streams according to the invention. On initialization, the code instructions of the computer program 210 are for example loaded into a RAM memory, before being executed by the processor of the processing unit 230.

Such a device 200 comprises:
a reception module 240, able to receive at least one stream sent by at least one client terminal to the address of the multicast group,
an extraction module 250, suitable for extracting therefrom at least one parameter relating to the quality of said stream,
a selection module 260, able to select at least one of said client terminals from among, as a function of the at least one parameter extracted,
a sending module 270, able to send to the address of the multicast group at least one management message comprising the at least one extracted parameter corresponding to the at least one selected client.

The modules described in conjunction with FIGS. 5 and 6 can be hardware modules or software modules.

The exemplary embodiments of the invention which have just been presented are merely a few of the conceivable embodiments. They show that the invention allows a client of a multicast distribution group to subscribe to the stream of another client, solely if it is ensured of having enough bitrate in the downgoing direction to receive it, doing so even if no centralized server is aware of the upgoing and downgoing bitrates guaranteed and authorized by the transport network.

The invention claimed is:
1. A method comprising:
requesting subscription to a data stream distributed in a multicast distribution group, said group comprising sources, including a server, a first client and a second client, said sources being connected together through an electronic communications network, the multicast distribution group being identified by an address, a stream sent to the address of the multicast group by a first source of the group being received by a second source of the group if the second source is previously a subscriber to the first source, the first client being a subscriber to the server, wherein requesting subscription comprises the following acts implemented by the first client:

receiving at least one management message that originates from the server and comprises at least one quality parameter relating to a stream sent to the address of the multicast group by the second client, making a decision of subscription to the second client, as a function of a criterion depending on the at least one quality parameter received, in case of a positive decision, sending a message requesting subscription to the second client.

2. The method for requesting subscription as claimed in claim 1, according to which the decision act takes into account a criterion comprising the value of a mean bit rate necessary in order to receive the stream sent to the address of the multicast group by the second client, and is preceded by an act of calculating this value, on the basis of the at least one quality parameter.

3. The method for requesting subscription as claimed in claim 1, according to which the decision act takes into account a criterion comprising the value of a queue size necessary in order to receive the stream sent to the address of the multicast group by the second client, and is preceded by an act of calculating this value, on the basis of the at least one quality parameter.

4. The method for requesting subscription as claimed in claim 1, where the subscription request message comprises the calculated value.

5. A method comprising:

managing data streams distributed in a multicast distribution group, said group comprising sources, including a server, a first client and at least one second client, said sources being connected together through an electronic communications network, the multicast distribution group being identified by an address, a stream sent to the address of the multicast group by a first source of the group being received by a second source of the group if the second source is previously a subscriber to the first source, the first client being a subscriber to the server, the server being a subscriber to said at least one second client and performing acts of:

receiving a stream sent by the second client to the address of the multicast group, and extracting therefrom at least one parameter relating to the quality of said stream, selecting at least one client from among the at least one second client, as a function of the at least one parameter extracted, sending to the address of the multicast group at least one management message comprising the at least one extracted parameter corresponding to the at least one selected client.

6. A device for requesting subscription to a data stream distributed in a multicast distribution group, said group comprising sources, including a server, a first client and a second client, said sources being connected together through an electronic communications network, the multicast distribution group being identified by an address, a stream sent to the address of the multicast group by a first source of the group being received by a second source of the group if the second source is previously a subscriber to the first source, the first client being a subscriber to the server, wherein the device comprises:

a processing unit;

a non-transitory computer-readable medium comprising instructions stored thereon, which configure the processing unit to perform acts of:

receiving at least one management message that originates from the server and comprises at least one quality parameter relating to a stream sent to the address of the multicast group by the second client, making a decision of subscription to the second client, as a function of a criterion depending on the at least one quality parameter received, in case of positive decision, sending a message requesting subscription to the second client.

7. The device according to claim 6, wherein the device constitutes a client item of equipment of the multicast distribution group, the client item of equipment being connected to the electronic communications network.

8. A device for managing data streams distributed in a multicast distribution group, said group comprising sources, including a server, a first client and at least one second client, said sources being connected together through an electronic communications network, the multicast distribution group being identified by an address, a stream sent to the address of the multicast group by a first source of the group being received by a second source of the group if the second source is previously a subscriber to the first source, the first client being a subscriber to the server, the server being a subscriber to said at least one second client and being able to receive a stream sent by the second client to the address of the multicast group, and to extract therefrom at least one parameter relating to the quality of said stream, wherein the device comprises:

a processing unit;

a non-transitory computer-readable medium comprising instructions stored thereon, which configure the processing unit to perform acts of:

selecting at least one client from among the at least one second client, as a function of the at least one parameter extracted, sending to the address of the multicast group of at least one management message comprising the at least one extracted parameter corresponding to the at least one selected client.

9. The device according to claim 8, wherein the device constitutes a server item of equipment of the multicast distribution group, the server item of equipment being connected to the electronic communications network.

10. A non-transitory computer-readable recording medium, comprising instructions stored thereon for implementation of a method, when the instructions are executed by a processor of a first client item of equipment, wherein the instructions configure the first client item of equipment to perform acts of:

requesting subscription to a data stream distributed in a multicast distribution group, said group comprising sources, including a server, the first client item of equipment and a second client item of equipment, said sources being connected together through an electronic communications network, the multicast distribution group being identified by an address, a stream sent to the address of the multicast group by a first source of the group being received by a second source of the group if the second source is previously a subscriber to the first source, the first client item of equipment being a subscriber to the server, wherein requesting subscription comprises the following acts implemented by the first client item of equipment:

receiving at least one management message that originates from the server and comprises at least one quality parameter relating to a stream sent to the address of the multicast group by the second client item of equipment, making a decision of subscription to the second client item of equipment, as a function of a criterion depending on the at least one quality parameter received, in case of a positive decision, sending a message requesting subscription to the second client item of equipment.

11. A non-transitory computer-readable recording medium, comprising instructions stored thereon for implementation of a method, when the instructions are executed by a processor of a server item of equipment, wherein the instructions configure the server item of equipment to perform acts of:

managing data streams distributed in a multicast distribution group, said group comprising sources, including the server item of equipment, a first client and at least one second client, said sources being connected together through an electronic communications network, the multicast distribution group being identified by an address, a stream sent to the address of the multicast group by a first source of the group being received by a second source of the group if the second source is previously a subscriber to the first source, the first client being a subscriber to the server item of equipment, the server item of equipment being a subscriber to said at least one second client and performing acts of:

receiving a stream sent by the second client to the address of the multicast group, and extracting therefrom at least one parameter relating to the quality of said stream, selecting at least one client from among the at least one second client, as a function of the at least one parameter extracted, sending to the address of the multicast group at least one management message comprising the at least one extracted parameter corresponding to the at least one selected client.

\* \* \* \* \*